Feb. 27, 1934.  S. S. VAUGHAN  1,948,549
MANUFACTURE OF DOUBLE BLADED FORGED AX HEADS
Filed April 17, 1930
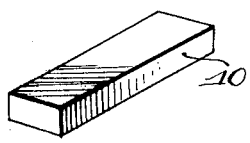
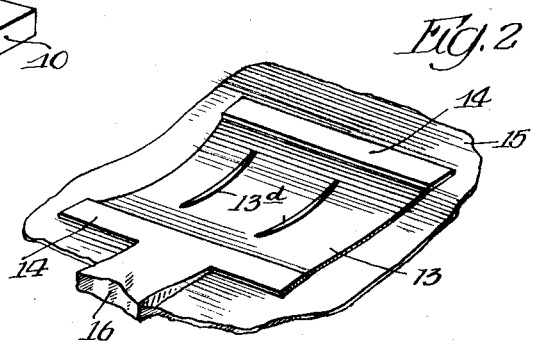
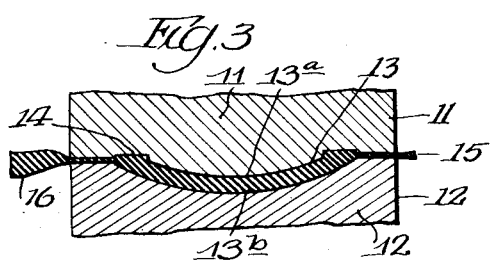
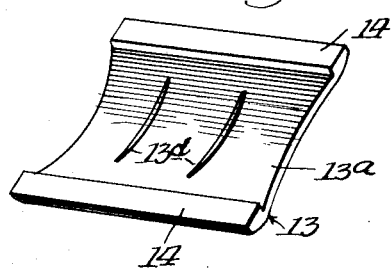
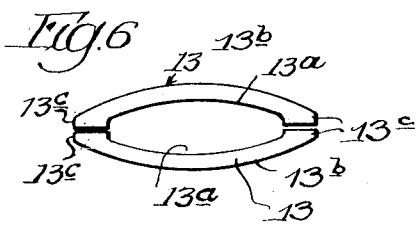
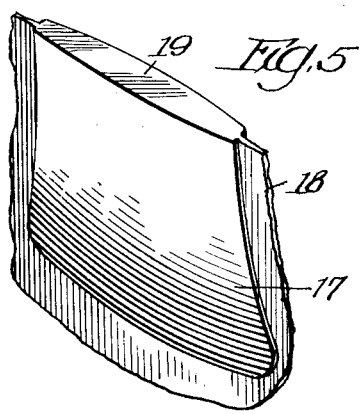
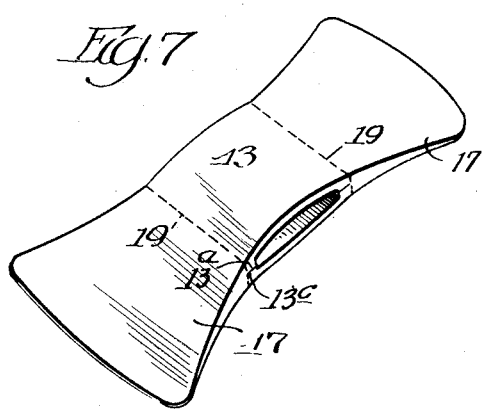
Inventor
Sanford S. Vaughan
By Fred Gerlach
Atty Patented Feb. 27, 1934

1,948,549

UNITED STATES PATENT OFFICE 1,948,549

MANUFACTURE OF DOUBLE-BLADED, FORGED AX HEADS

Sanford S. Vaughan, Chicago, Ill., assignor to Vaughan & Bushnell Mfg. Co., Chicago, Ill., a corporation of Illinois Application April 17, 1930. Serial No. 444,932

1 Claim. (Cl. 76—103)

The present invention relates generally to the manufacture of forged ax heads. More particularly, the invention relates to the manufacture of that type of ax head which consists of (1) a poll or head of forged metal having a handle-receiving eye extending transversely therethrough; and (2) a pair of separately formed, forged metal blades which are welded to the ends of the poll so that they extend in opposite directions.

One object of the invention is to provide an improved method of forming a forged ax head of the aforementioned type which is generally an improvement upon previously employed methods and results in the production of an improved and exceptionally strong, durable, double bladed ax head.

Another object of the invention is to provide a method of forming a double bladed, forged ax head of the type under consideration which contemplates drop forging separate pieces of heated metal to form a pair of complemental poll sides of such shape and character that they form when placed together, a handle socket between them and have comparatively short ribs at their ends which are adapted to abut against one another to close the ends of the socket and terminate immediately outwardly of the socket ends, then placing the poll sides together and arranging a pair of substantially full length blades adjacent the ends of the socket respectively and in abutting relation with respect to the ribs, and finally by a single electric welding operation uniting together the abutting faces of the ribs at one end of the handle socket and joining to such ribs the full length blade adjacent such one end of the socket and by a second single electric welding operation uniting together the abutting faces of the ribs at the other end of the socket and joining to such ribs the other full length blade.

Other objects of the invention and the various advantages and characteristics of the present ax-forming method will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Fig. 1 is a perspective of a bar of metal from which one of the poll sides of the ax head is formed. Fig. 2 is a perspective of the bar after it has been forged into the proper shape. Fig. 3 is a section through the forging dies used for forming the poll sides. Fig. 4 is a perspective showing one of the forged poll sides after the flash has been trimmed away. Fig. 5 is a perspective illustrating a forging from which one of the blades is formed. Fig. 6 is a perspective showing the poll sides assembled, preparatory to welding them together. Fig. 7 is a perspective of the finished ax head.

The improved method consists in first heating a pair of bars or pieces 10 of suitable metal, such as steel, to render them ductile for forging; then forging the bars between a pair of dies 11 and 12 into shape to form a pair of complemental poll sides. The dies are adapted to shape each poll side so that it embodies a curved side portion 13 with a concave inner face 13$^a$ and a convex outer face 13$^b$ and with comparatively short ribs 14 at either end. In forging the poll sides from the bars 10, the excess metal is spread into flash 15 and stubs 16 by which the operator can grip the metal by tongs. After the forging operation the flash 15 and stubs 16 are trimmed from the forgings so they will have the shape shown in Fig. 4. Bars of metal are forged into the shape shown in Fig. 5 to form blades 17 for the ax head, the excess metal being spread into flash 18 which is trimmed away.

Upon completion of the blades, the poll sides are placed together so that their ribs 14 abut and an elongated handle forming socket or eye is formed between the side portions 13. Thereafter, the blades 17 are placed adjacent the ends of the socket respectively and so that the inner edges 19 thereof abut against the ribs 14. After assembly of the poll sides and blades, the abutting faces of the ribs at one end of the handle socket are united together and the blade opposite them by means of a single electric welding operation, and by a second single welding operation the ribs at the other end of the handle socket are united or joined together and to the other blade.

To complete the ax head, the flash that is produced by welding is chipped off and the side surfaces of the blade and poll are polished. The concave inner faces 13$^a$ of the poll sides are preferably of such shape or conformation that the handle socket is elliptical. If desired ribs 13$^d$ may be forged on the inner faces 13$^a$ of the poll sides in order to interlock with the handle when the latter is driven into the socket.

In practice, it is customary to stamp a tradename or mark on the sides of the ax head, and this can be conveniently done before the poll sides are welded together, and while the metal is somewhat ductile after the forging operation. If desired the poll sides may be forged or shaped by rolling a long bar or strip of metal into the proper cross-sectional shape and then shearing the rolled bar into sections each adapted, and of the required length, to form one of the poll sides. The poll sides and blades may then be welded together as hereinbefore described.

The ribs 14 on the poll sides are only of sufficient area or height to provide sufficient metal for joining the poll sides together by weld joints above and below the handle socket and to close the ends of the socket, so that the blades will be joined to the poll close to the socket and form substantially all portions of the ax head which are subjected to wear in cutting. This also makes it possible to join the blades to the ribs and to join the entire area of the meeting faces of the ribs by single electric welding operations and thus avoid separate operations for that purpose.

The invention exemplifies a method of making ax head in which the poll of the head is formed of separate side pieces, so that no punching or piercing of the poll is necessary for socket-forming purposes; in which the shaping of the poll sides is simple and can be quickly performed so that only a single heating is necessary; in which the brand marking can be readily performed before the roll sides are welded together; in which the waste of metal is reduced to a minimum; in which simple dies can be used for the various parts in which locking ribs for the ax handle can be readily forged on the inner faces of the poll sides; and by which the head can be produced at a low cost.

The invention is not to be understood as restricted to the details set forth, since these may be modified within the scope of the appended claim, without departing from the spirit and scope of the invention.

Having thus described the invention, what I claim as new and desire to secure by Letters Patent, is:

That improvement in the manufacture of double bladed, forged ax heads which consists first in drop forging separate pieces of heated metal to form a pair of complemental poll sides shaped so that when placed together they form a handle socket therebetween and having comparatively short ribs at the ends thereof adapted to abut against one another to close the ends of the socket and terminating immediately outwardly of the socket ends, then placing the poll sides together and arranging a pair of substantially full length blades adjacent the ends of the socket respectively and in abutting relation with respect to the ribs, and finally by a single electric welding operation uniting together the abutting faces of the ribs at one end of the handle socket and joining to such ribs the full length blade adjacent said one end of the socket and by a second single electric welding operation uniting together the abutting faces of the ribs at the other end of the socket and joining to such ribs the full length blade adjacent said other end of the socket.

SANFORD S. VAUGHAN.